Oct. 25, 1966 R. C. LAYNE 3,280,414
LOADING RAMP
Filed April 29, 1963 3 Sheets-Sheet 2

INVENTOR:
RICHARD C. LAYNE
BY Eaton, Bell, Hunt & Seltzer
ATTORNEYS

United States Patent Office 3,280,414
Patented Oct. 25, 1966

3,280,414
LOADING RAMP
Richard C. Layne, Charlotte, N.C., assignor to HTL Industries Inc., Mecklenburg County, N.C., a corporation of North Carolina
Filed Apr. 29, 1963, Ser. No. 276,326
11 Claims. (Cl. 14—71)

This invention relates to an improved tiltable ramp assembly of the type adapted to be permanently installed on loading docks to facilitate loading and unloading trucks and other carriers.

Various types of loading ramp assemblies are currently in use which generally comprise a tiltable rectangular ramp body loosely fitting within a well having an open front and formed in the front wall and floor of the dock platform. The ramp body is normally supported in a horizontal position substantially flush with the floor of the dock platform and has an extension plate or "lip" pivotally supported at its front portion and normally substantially closing the front of the well. Various mechanisms have been used heretofore for swinging upwardly the front end of the ramp body while simultaneously swinging forwardly and upwardly the ramp extension so the same could overlie the bed of a truck backed up to the loading dock and so the ramp body subsequently could be lowered to position the ramp extension upon the truck bed and overlying any gap between the dock platform and the truck bed.

It is the primary object of this invention to provide an improved loading ramp assembly of the type described including novel mechanism for operating the same which is more efficient and reliable than the operating mechanisms associated with any prior art types of ramp assemblies to my knowledge.

The primary object of the invention having been stated, other objects will appear as the description proceeds when taken in connection with the accompanying drawings, in which.

Generally, the ramp assembly of the present invention includes a tiltable ramp body or platform which is operated by a novel and improved mechanism including a motivating torsion bar, one end portion of which is secured against rotation and the other end portion of which is operatively connected to the tiltable ramp body or platform in such a manner as to apply a yieldable upward force to the body of a magnitude at least equal to, and preferably greater than, the weight of the ramp body, and wherein a normally active, releasable, restraining means or braking device normally restrains upward movement of the ramp body and is arranged to be released to permit the ramp body to move upwardly if it does not already occupy its fully raised position.

The torque or twist in the torsion bar and the amount of braking force in the restraining means are so adjustable that the addition of a small amount of weight, such as an operative's weight, to the ramp body may cause the same to move downwardly in opposition to the torque in said motivating torsion bar. Further, a ramp extension plate, commonly known in the art as a "lip" or "lip plate," is hingedly connected to the front end of the ramp body by novel means including a lip torsion bar which normally urges outwardly the extension plate. However, the extension plate is automatically yieldably retracted, by novel means to be described hereinafter, as the ramp body is forced downwardly, unless the extension plate first engages and is obstructed by a carrier bed or other obstruction positioned forwardly of the ramp body. Other features peculiar to the present invention will appear in the following detailed description thereof.

Figures 5, 6, 7:
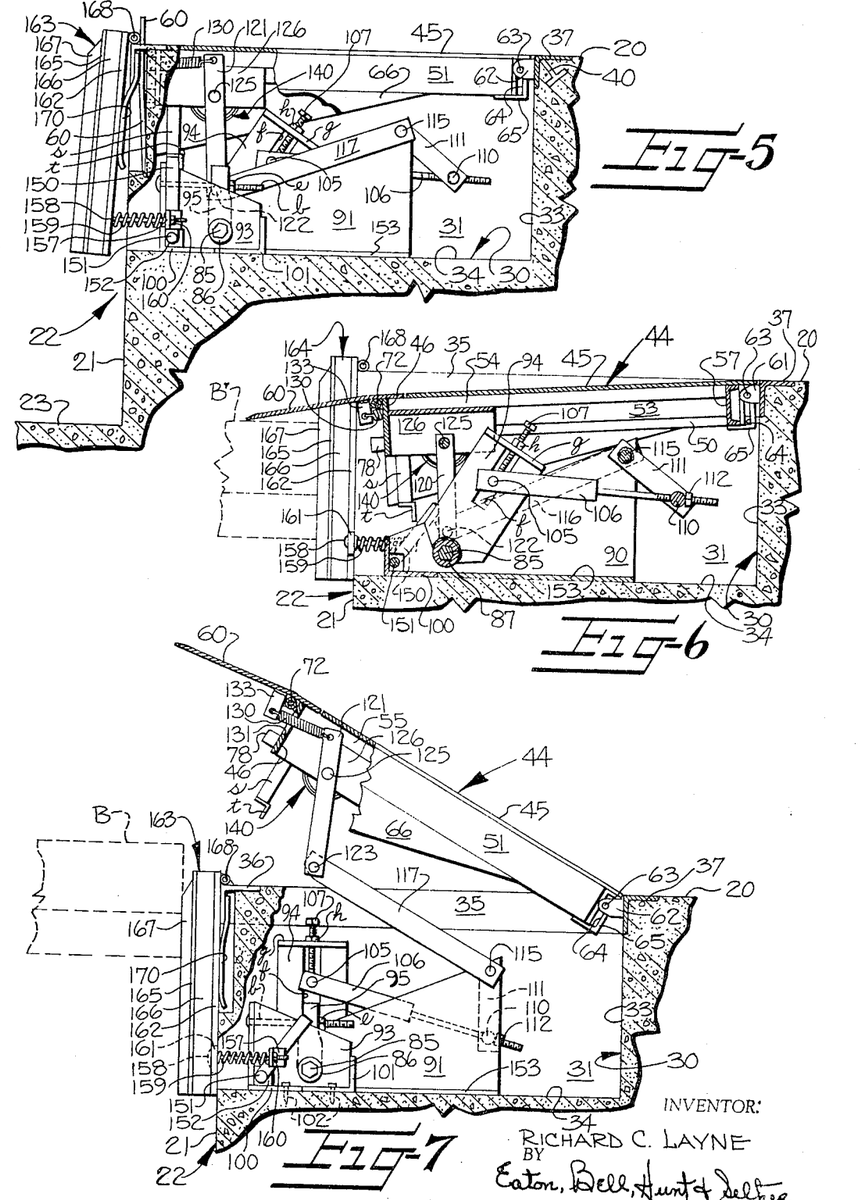
FIGURE 5 is a side elevation, partially broken away and partially in cross-section, taken substantially along line 5—5 in FIGURE 3.
FIGURE 6 is a longitudinal vertical sectional view taken substantially along line 6—6 of FIGURE 3, but showing the position occupied by the movable parts when the ramp assembly is employed in association with a carrier bed whose floor is positioned on a level lower than the floor of the dock platform.
FIGURE 7 is a view similar to FIGURE 5, showing the ramp body in fully raised or tilted position, and in association with a carrier bed whose floor is positioned on a higher level than the dock platform floor, and being taken substantially along line 7—7 in FIGURE 4.

Referring more specifically to the drawings, the numerals 20, 21 designate the floor and front vertical wall of a dock platform broadly designated at 22 and which projects upwardly from a substantially level grade surface 23. The floor 20 is approximately four feet above the level of grade surface 23 at many loading docks to substantially correspond to the mean level of the upper surfaces of commercial truck beds or carrier beds B (FIGURE 7).

Floor 20 and front wall 21 of dock platform 22 have a substantially rectangular well 30 therein which is open at its top and front portion when the ramp assembly of the present invention is not installed therein and whose opposed side walls 31, 32, rear wall 33 and bottom wall or floor 34 are preferably formed of a substantial thickness of concrete or other material which will retain its shape and will adequately support the associated structural members of the present ramp assembly. In order to support the improved ramp assembly within well 30, and to also protect the junctures of the upper edges of walls 31, 32, 33 with platform floor 20, curb frame members 35, 36, 37 are suitably secured to and form the upper edges of side walls 31, 32, 33. In this instance, frame members 35, 36, 37 are each shown in the form of an angle bar having one or more anchor rods 40 suitably secured thereto or formed integral therewith and which are embedded in the concrete or other material of which the walls 31, 32, 33 are formed. The upper surfaces of angle bars 35, 36, 37 are preferably flush with floor 20 and the substantially vertical faces of angle bars 35, 36, 37 are preferably flush with the corresponding walls 31, 32, 33.

RAMP BODY

Figures 1, 2:
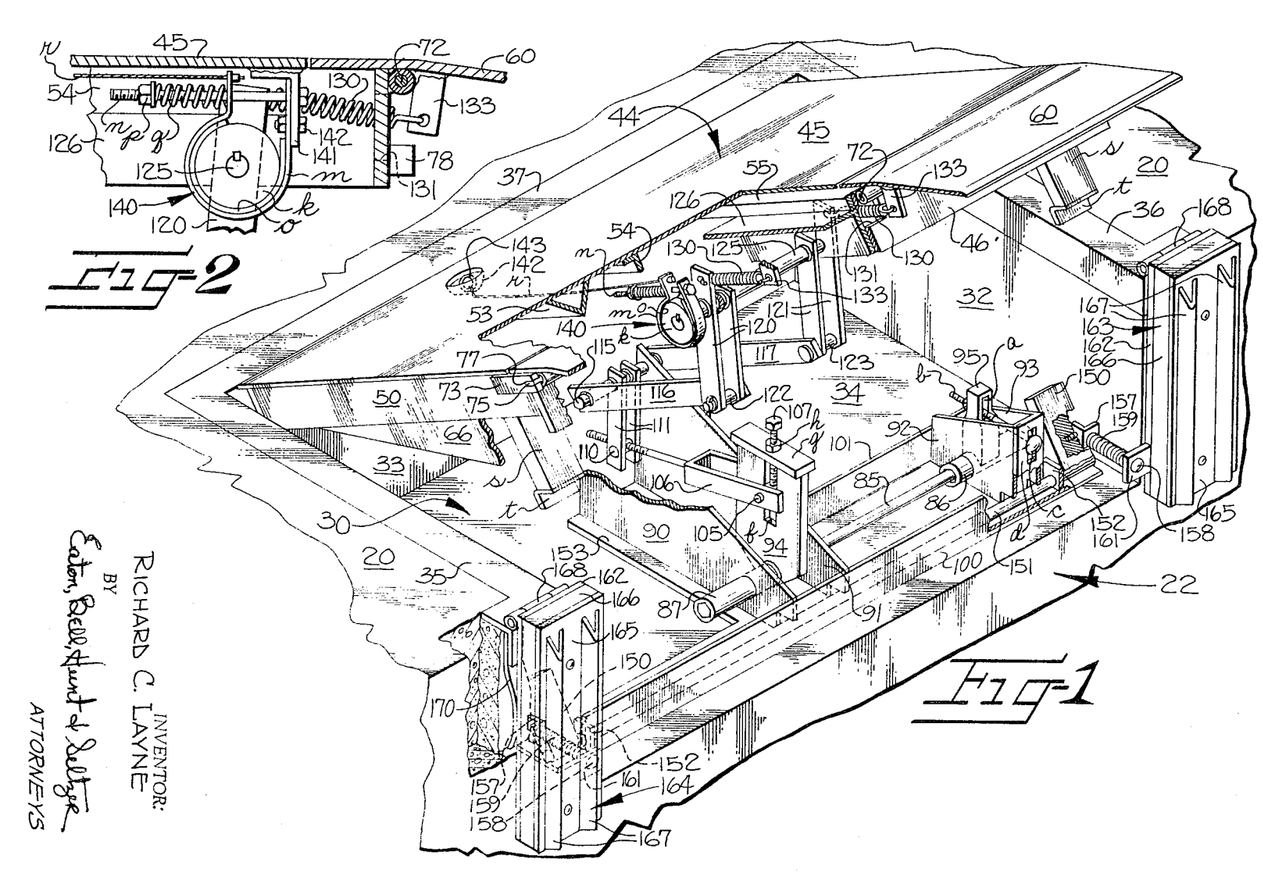
FIGURE 1 is a perspective view of the improved ramp assembly of the present invention showing the ramp body and its front extension plate in raised position and with parts broken away so as to clearly illustrate the novel operating mechanism.
FIGURE 2 is an enlarged fragmentary elevation of the braking device 140 shown in the central portion of FIGURE 1 with associated structure being shown in cross-section.
Figure 3:
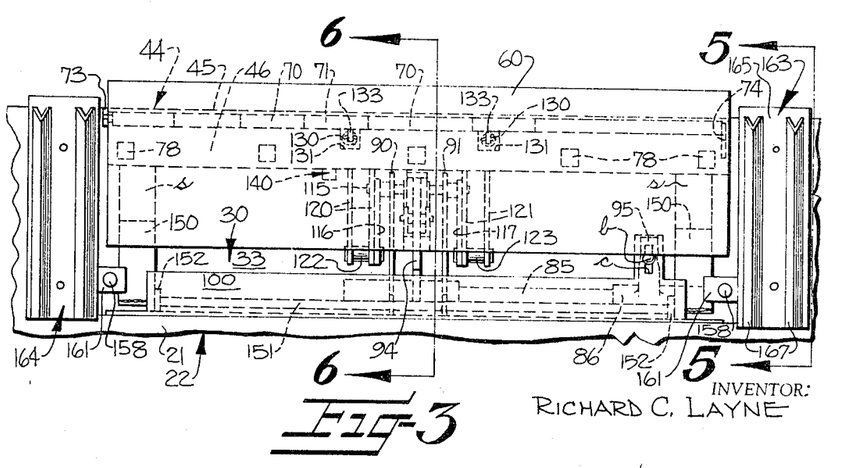
FIGURE 3 is a front elevation of the ramp assembly, on a reduced scale, showing the ramp body in level position and the extension plate in retracted or vertical position.
Figure 4:
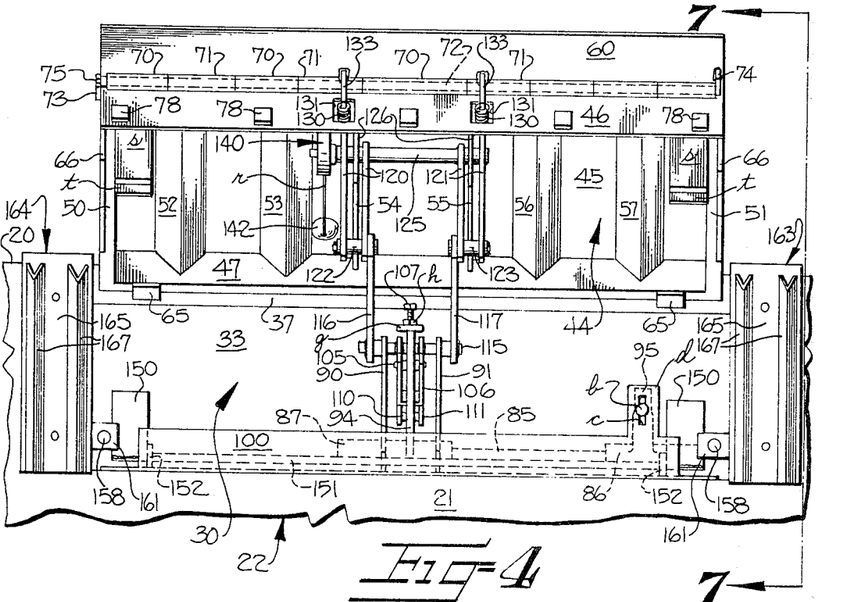
FIGURE 4 is another front elevation of the ramp assembly in which its movable parts occupy the same position as in FIGURE 1.

The tiltable ramp body, broadly designated at 44, comprises a substantially rectangular main ramp plate 45 preferably made from sheet metal commonly known as "checker plate" and whose upper surface is preferably roughened or formed with small projections and recesses therein for traction purposes. Ramp plate 45 should be of somewhat lesser width and length than well 30 so that it may fit loosely therewithin as shown in FIGURES 1, 3 and 4. Main ramp plate 45 is welded or otherwise suitably secured to a substantially rectangular frame including front and rear elongate plates or frame members 46, 47 welded or otherwise suitably secured to the front and rear ends of opposed side frame members 50, 51 and a plurality of spaced intermediate frame members, there being six intermediate frame members used in this instance indicated at 52–57 in FIGURES 1, 3 and 6.

The opposed side frame members 50, 51 are shown in the form of channel bars and the intermediate frame members are shown in the form of angle bars. The centermost pair of intermediate frame members 54, 55 are used for connecting ramp body 44 to the ramp tilting or elevating mechanism in a manner to be later described. The front edge of plate 45 is positioned in spaced relation to and rearwardly of the front surface of front frame member 46 of ramp body 44 to accommodate a "lip" or ramp extension plate 60 to be later described in detail.

The rear portion of main ramp plate 45 projects rearwardly from rear frame member 47 to facilitate hingedly and floatingly connecting ramp body 44 to the rear wall 33 of well 30, adjacent the upper edge thereof, through the medium of the rear curb frame member 37. To this end, it will be observed in FIGURES 3, 5, 6 and 7 that the front surface of rear curb bar 37 has a pair of forwardly projecting bifurcated hinge brackets 61, 62 suitably secured thereto. Each hinge bracket 62 has a hinge pin 63 therein which extends through a vertically extending slot 64 defined in a corresponding hinge block 65 fixed to the rear surface of the rear frame member 47 of ramp body 44 and to plate 45. The hinge blocks 65 loosely fit between opposed side portions of the corresponding bifurcated hinge brackets 62. Thus, although the rear portion of main ramp plate 45 normally rests upon hinge brackets 62, it is seen that ramp body 44 and its plate 45 may be canted with respect to the hinge brackets 62 in the event that the carrier bed B or B', from which articles are to be removed or on which articles are to be placed, extends at an angle with respect to the floor 20 of loading dock platform 22.

A substantially triangularly-shaped skirt or toe plate 66 may be suitably secured to and depend from each side frame members 50, 51 of ramp body 44. The length and the height of the front ends of toe plates 66 should preferably be such as to substantially close the gap between ramp body 44 and the curb frame members 35, 36 when ramp body 44 is positioned at what would normally be its maximum angle or maximum height when the ramp extension plate 60 is resting upon a carrier bed. It is apparent that the toe plates 66 then serve as shields to prevent the operator from accidentally inserting his foot in the well 30 or from dropping other than very small or very large objects into the well 30.

RAMP EXTENSION PLATE

At a point spaced forwardly from its rear edge, ramp extension palte 60 is hingedly or pivotally connected to the front transverse frame member 46 of ramp body 44 so that, when the ramp extension plate 60 occupies lowered or retracted substantially vertical position such as that shown in FIGURES 3 and 5, in which it is positioned in substantially right-angular relation to the main ramp plate 45, the rear portion of ramp extension plate 60 then projects upwardly above the level of main ramp plate 45 a sufficient distance to serve as a safety curb so that any hand-truck or motorized industrial truck which may then be positioned upon main ramp plate 45 will be restrained from rolling off the front end of the ramp body 44 by the upwardly projecting safety curb formed of the ramp extension plate 60. Accordingly, the front surface of the front transverse frame member 46 of ramp body 44 has a plurality of longitudinally spaced and alined hinge tubes 70 welded or otherwise suitably connected thereto which are adapted to loosely receive therebetween a plurality of mating hinge tubes 71 welded or otherwise connected to the lower or inner surface of ramp extension plate 60. Hinge tubes 71 are so spaced from the rear edge of ramp extension plate 60 that, when ramp extension plate 60 occupies extended position with respect to main ramp plate 45, its rear portion may bear against the upper surfaces of frame members 50–57 and/or front frame member 46 with the rear edge of ramp extension plate 60 then being positioned closely adjacent to and forwardly of the front edge of main ramp plate 45, and with the upper surfaces of both plates 45, 60 then being in substantially flush relationship. When extension plate 60 is resting upon a carrier bed and is extended, it prevents further downward movement of ramp body 44 when a load is being moved thereover.

An elongate lip torsion bar or torsion rod 72 serves as a hinge pin and loosely extends through the tubes 70, 71, all of which are in axial alinement with each other. Opposed ends of the torsion rod 72 are suitably connected to a pair of torque applying elements or blocks 73, 74 welded or otherwise suitably secured to ramp body 44 and ramp extension plate 60, respectively. In this instance, opposed ends of torsion bar 72 are connected to the torque applying elements 73, 74 by means of a polygonally-shaped or substantially rectangularly-shaped key portion 75 formed on each end of the torque bar 72 and which fit in corresponding key slots 77 formed in the torque applying elements 73, 74.

The torque applying elements 73, 74 are welded or otherwise suitably secured to the front portion of frame member 50 and the lower or inner surface of ramp extension plate 60, respectively. The torsion or torque applying elements 73, 74 are so arranged with respect to lip torsion bar 72 that they apply very little or no torque or twist to torque bar 72 when ramp extension plate 60 occupies fully extended position in alinement with main ramp plate 45. However, when ramp extension plate 60 occupies a retracted position substantially normal to the main ramp plate 45, it is apparent that torsional angle between opposed ends of the torque bar or rod 72 would then be approximately 90° and that the torque then being applied to torque bar 72 would then be sufficient to raise the ramp extension plate 60 to extended position in the absence of means, to be later described, holding the extension plate 60 in the retracted position.

It is apparent that the material of which lip torsion bar 72 is made should be such that it may be twisted through a torsional angle of more than 90° a great many times without exceeding its elastic limit or destroying its elasticity to any material extent so that, when ramp extension plate 60 is released from its retracted position, plate 60 will always move upwardly to or substantially to the fully extended position in alinement with main ramp plate 45, although the overbalancing weight of ramp extension plate 60 may cause plate 60 to rebound to a slight angular position with respect to main ramp plate 45 following each movement thereof from retracted to fully extended position.

In actual practice, a steel ramp extension plate equivalent to plate 60 six feet long, approximately ½ inch thick, having a measurement of approximately 15½ inches from the axis of torsion rod 72 to the free edge thereof and mounted on a steel torsion rod which was one inch in diameter would move downwardly from one inch to three inches under its own weight following its movement from retracted to fully extended position. Thus, when ramp body 44 subsequently was lowered, the free edge portion of a ramp extension plate equivalent to plate 60 would engage and slide against the upper surface of the carrier bed B or B' until the relative movement between the ramp body 44 and the extension plate 60 caused the plates 45, 60 to extend in substantial alinement with each other.

In the absence of a carrier bed being positioned adjacent the open front of well 30 as the ramp body 44 is moved downwardly from a fully raised position to the substantially level position shown in FIGURES 3 and 5, yieldable operative connections between ramp extension plate 60 and the ramp body tilting mechanism cause ramp extension plate 60 to swing downwardly from a substantially fully extended position (FIGURES 1 and 7) to the retracted position of FIGURES 3 and 5, in the course of which extension plate 60 may move quite rapidly relative to ramp body 44. In order to relieve the shock of retracting movement of ramp extension plate 60, resilient blocks 78, preferably made of hard rubber or its equivalent, are adhesively or otherwise suitably secured to the front surface of front frame member 46 of ramp body 44 (FIGURE 4).

The resilient shock absorbing blocks 78 also absorb the shock of the movement of a carrier bed against ramp extension plate 60, when the latter occupies retracted position, in the event that the carrier bed approaches dock platform 22 at such an angle that it engages the retracted ramp extension plate 60 before it engages front cushion blocks to be later described. Of course, the shock absorbing blocks 78 would be most effective when absorbing the impact of a low carrier bed therewith, such as the carrier bed B' shown in FIGURE 6.

Ramp extension plate 60 is preferably slightly curved or bent downwardly at its forward portion along a line substantially parallel to and adjacent lip torsion bar 72 so that the free front edge of extension plate 60 may rest against or be positioned in close proximity to the floor of any carrier beds which may be disposed on a substantially higher level than the floor 20 of the dock platform 22. Further, the free front edge of extension plate 60 is preferably beveled or chamfered at its upper portion to assist in easing the movement of wheeled vehicles from the carrier bed onto extension plate 60.

RAMP BODY TILTING MECHANISM

The novel torsion bar motivated mechanism for tilting ramp body 44, and for simultaneously releasing ramp extension plate 60 so that it may swing upwardly to extended position as ramp body 44 is elevated or tilted, will now be described. As best shown in FIGURES 1, 5, 6 and 7, a motivating torsion bar 85 is positioned adjacent to and spaced above bottom wall or floor 34 of well 30. Torsion bar 85 is also spaced rearwardly from, but disposed adjacent to, the vertical plane of the front wall 21 of dock platform 22.

Opposed end portions of motivating torque bar 85 are connected to a torque applying member 86 and a torque transmitting member 87, the torque applying and transmitting members 86, 87 being in the form of sleeves, in this instance. In order to insure that there is no slippage between motivating torque bar 85 and sleeves 86, 87, the opposed ends of motivating torque shaft or bar 85 are preferably polygonally-shaped and the interior of the sleeves 86, 87 are formed in a like manner to that of opposed ends of motivating torque bar 85.

Sleeves 87, 86 are mounted in respective pairs of spaced bearing members or plates 90, 91 and 92, 93 and have respective crank arms 94 thereon projecting upwardly therefrom between the respective pairs of bearing plates 90, 91 and 92, 93. Bearing plates 92, 93 are relatively short as compared to bearing plates 90, 91 and are welded or otherwise suitably secured to the front and rear flanges and bottom web portions of a pair of angle bars 100, 101 suitably secured to the floor or bottom wall 34 of well 30, as by lag screws 102 (FIGURE 7).

Crank arm 95 of torque applying sleeve 86 has an elongate longitudinally extending slot a therein (FIGURE 1) through which the rear portion of an adjustment screw b loosely extends. Adjustment screw b also loosely extends through a slot c (FIGURES 1, 3 and 4) formed in a plate d suitably secured to or formed integral with the front upright flange of frame member 100 and to which the front edges of bearing plates 92, 93 may also be suitably secured, such as by welding.

As best shown in FIGURE 5, the threaded rear end of adjustment screw b has a nut e threaded thereon which bears against the rear surface of crank arm 95 of torque applying sleeve 86. By adjusting nut e on adjustment screw b, the angular position of crank arm 95 may be varied about the axis of motivating torsion bar 85 to thereby vary the amount of twist or torque imparted to torsion bar 85 while restraining the corresponding end of torsion bar 85 against rotation, once adjusted, as will be more fully described hereinafter.

The crank arm 94 of torque transmitting sleeve 87 is operatively connected to the front portion of the ramp body 44 through an adjustable linkage system which is particularly arranged so as to be confined within the well 30 in dock platform 22 and to transmit angular movement from the torsion bar 85 to the ramp body 44, and vice versa, without interfering with sufficient lowering of ramp body 44 to accommodate relatively low carrier beds (see FIGURES 6). To this end, it will be observed in FIGURES 1, 5, 6 and 7 that the upper portion of crank arm 94 is provided with a substantially radially extending slot f therethrough through which a pivot shaft 105 loosely extends. The bifurcated front portion of a bottom link 106 straddles crank 94 and is journaled on opposed end portions of pivot shaft 105.

Pivot shaft 105 has the lower end of an adjustment screw 107 threaded therein which is threaded through a bar g closing the upper end of slot f and being suitably secured to or formed integral with the free end of crank arm 94. A lock nut h is threadedly mounted on adjustment screw 107 for maintaining the same in adjusted position. It is apparent that adjustment screw 107 facilitates the adjustment of pivot shaft 105 toward and away from sleeve 87 to increase or decrease the mechanical advantage therebetween, as desired.

The threaded rear portion bifurcated link 106 loosely penetrates a pivot shaft 110 pivotally mounted between the lower portions of a pair of closely spaced parallel links 111. The effective length of bifurcated bottom link 106 is determined by an adjustment screw 112 threaded on the threaded rear portion of link 106 and bearing against the rear surface of pivot shaft 110. It will be noted that links 111 are positioned relatively close together so they may move freely between the rear portions of bearing plates 90, 91 in whose front portions the torque transmitting sleeve 87 is journaled.

The upper portions of links 111 are fixed to a transverse pivot shaft 115 journaled in and extending between the rear upper portions of bearing plates 90, 91. Shaft 115 is disposed a substantial distance rearwardly from torsion bar 85 and is disposed substantially above the level of torsion bar 85. Opposed end portions of piovt shaft 115 outwardly of bearing plates 90, 91 have the rear ends of respective parallel links 116, 117 welded or otherwise secured thereon.

The front end portions of links 116, 117 are pivotally connected to the lower end portions of respective composite or built-up levers 120, 121, as at 122, 123. In this instance, composite levers 120, 121 are each shown in the form of a pair of spaced parallel bars, the outermost of which is longer than the other. Medial portions of composite levers 120, 121 are welded or otherwise suitably secured to a brake shaft 125 journaled in opposed depending flanges of an inverted substantially U-shaped bracket or channel bar 126. Bracket 126 is welded or otherwise suitably secured to the lower surfaces of the centermost pair of forwardly and rearwardly extending frame members 54, 55 of ramp body 44.

The outer portion of each composite lever 120, 121 extends upwardly beyond brake shaft 125 and has the rear end of a tension spring 130 connected thereto. Each spring 130 loosely extends through a corresponding opening 131 provided in the front frame member 46 of ramp body 44 (FIGURE 2). The front end of each spring 130 is connected to a spring anchor arm 133 welded or otherwise suitably secured to and projecting inwardly or downwardly from ramp extension plate 60.

The torque applying sleeve 86 should be so angularly adjusted relative to torque transmitting sleeve 87 that the torque bar 85 is under a minimum of torsion or twist when ramp body 44 occupies fully raised position substantially as shown in FIGURE 7 and at which time the torque acting on torsion bar 85 should be sufficient only to slightly more than support the weight of the front portion of the ramp body, and the ramp extension plate 60, in the fully elevated or steepest position. The limit of upward movement of ramp body 44 may be determined by engagement of the rear lower edge of plate 45 with hinge brackets 62.

Also, the material of which the torque bar 85 is made and the size thereof should be such that the inherent resisting torque or elasticity of the torsion bar 85, taking into consideration the linkage connecting the same with the ramp body 44, should be such that a weight of from 100 pounds to 150 pounds will overcome the resisting torque of the torsion bar 85 sufficiently to move downwardly the free front end of ramp body 44 a substantial distance below the level of the floor 20 of dock platform 22 to accommodate trucks or carriers whose beds may be positioned on lower than normal levels when the vehicle supporting the same is resting upon the grade surface 23. The limit of downward movement which may be imparted to ramp body 44, such as by a person standing thereupon, may be determined by engagement of links 116, 117 with torque transmitting sleeve 87. A safety device will be later described for limiting downward movement of ramp body 44 to a neutral or normal, inoperative position substantially flush with floor 20 of dock platform 22.

From the foregoing description, it is apparent that, in the absence of some external force being applied to motivating torsion bar 85, either directly or indirectly, to resist or overbalance the torque acting on that portion of the motivating torsion bar 85 positioned within torque transmitting sleeve 87, ramp body 44 would always occupy its fully raised or most steeply inclined position as shown in FIGURE 7. Of course, any time that a person or object would apply sufficient weight to the upper surface of the main ramp plate 45 of ramp body 44, it is apparent that ramp body 44 would then move downwardly until such downward movement was obstructed by some immovable object, such as by the ramp extension plate 60 engaging the upper surface of a carrier bed, or the links 116, 117 engaging sleeve 87, for example.

RAMP RESTRAINING AND INDEX DEVICE

A manually operable restraining or slip braking device, broadly designated at 140 (FIGURES 1 and 2), is provided for normally maintaining the upper surface of main ramp plate 45 substantially flush with the floor 20 of dock platform 22 in opposition to the torque in torsion bar 85 when the ramp assembly is not being used. The braking device 140 is also provided as a manually operable means for controlling or indexing the extent to which ramp body 44 may be raised. Although torsion bar 85 imparts smooth, slow upward movement to ramp body 44, the braking device 140 may also be used for further controlling the rate at which the ramp body 44 may move upwardly from a lowered position.

Keeping in mind the fact that the upper medial portions of composite levers 120, 121 are fixed to brake shaft 125, it will be observed in FIGURES 1 and 2 that one end of brake shaft 125 has a brake drum $k$ fixed thereon which is a part of braking device 140. Brake drum $k$ is engaged by a brake band $m$ which is preferably made from a strip of steel. Brake band $m$ preferably may be provided with a suitable friction liner $o$ on its inner surface and engaging the periphery of brake drum $k$.

One end of brake band $m$ is suitably secured to an angle clip 141, as by a bolt 142. Angle clip 141 is fixed to main ramp plate 45, as by welding. The other, free, end of brake band $m$ is loosely penetrated by an adjustment screw or rod $n$ whose forward end is fixed to the fixed end of brake band $m$ and whose rear end extends a substantial distance beyond the free end portion of brake band $m$ and has a nut $p$ threaded thereon for holding a compression spring $q$ against the free end of brake band $m$ under a predetermined pressure determined by the adjustment of nut $p$.

Since corresponding ends of links 106, 116, 117 are fixed to pivot shaft 115, and the composite levers 120, 121 are fixed on brake shaft 125, it follows that any angular movement of motivating torsion bar 85 is transmitted to brake shaft 125 and drum $k$. Conversely, any angular movement imparted to brake shaft 125 by applying sufficient weight to ramp body 44 to cause the same to move downwardly, will cause corresponding angular movement to be imparted to torque bar 85 through the intervening linkage. Thus, in effect, motivating torsion bar 85 transmits a proportional magnitude of torque to brake shaft 125 and drum $k$. It is apparent, therefore, that the spring $q$ normally applies sufficient pressure to brank band $m$ to overbalance any torque transmitted from motivating torsion bar 85 to brake shaft 125 at all times in which braking device 140 is active.

Braking device 140 is deactivated by an operative any time ramp body 44 is to be elevated. To this end, one end of a normally slack cable $r$ is connected to the free end portion of brake band $m$ and extends rearwardly therefrom. The rear portion of cable $r$ loosely extends through the bottom of an open-topped cup-shaped member 142 welded or otherwise suitably secured to, communicating with, and depending from main ramp plate 45. The free end of cable $r$ has a suitable handle or metal loop 143 attached thereto which normally rests in the cup-shaped member 142.

It is thus apparent that the operative merely withdraws the handle or loop 143 from the open upper end of cup-shaped member 142 and pulls the cable $r$ taut with sufficient force to deactivate or release braking device 140. Of course, the operative may release the cable $r$ at any time in the course of upward movement of ramp body 44 so that it may be stopped in any desired position between the level of the floor 20 and the maximum angular position to which it may be moved under the influence of the torque in motivating torsion bar 85.

As heretofore stated, the upper outer portions of levers 120, 121 are connected to ramp extension plate 60 by means of the springs 130 and spring anchor arms 133. Springs 130 should be so constructed that they are completely or substantially relaxed when the uppermost ends of the outer portions of levers 120, 121 occupy their foremost positions with respect to ramp body 44. The upper ends of levers 120, 121 occupy foremost position when the ramp body 44 occupies fully raised position with the rear edge of plate 45 bearing against hinge brackets 62. Thus, springs 130 are gradually relieved of tension as ramp body 44 moves upwardly from its normal substantially level position so the torque or twist in the lip torsion bar 72 gradually becomes effective in moving ramp extension plate 60 from retracted to extended position during upward movement of ramp body 44.

Conversely, as ramp body 44 is moved downwardly in the absence of extension plate 60 moving into engagement with a carrier bed or other obstruction, springs 130 will be placed under gradually increasing tension by the rearwardly moving upper ends of composite levers 120, 121 so that ramp extension plate 60 will occupy fully retracted or substantially vertical position when ramp body 44 occupies substantial level or inoperative position as shown in FIGURES 3 and 5.

RAMP BODY-SUPPORTING SAFETY DEVICE

A normally active safety device, releasable by the movement of a carrier bed to loading position, is provided for supporting ramp body 44 in substantially horizontal or inactive position substantially flush with floor 20 of loading dock platform 22 when the ramp assembly is not being used for loading or unloading purposes and so that the ramp body 44 will not inadvertently swing downwardly below the level of floor 20 whenever heavy objects are placed upon main ramp plate 42 or hand trucks or the like move across the ramp body 44. The safety device includes a pair of movable normally substantially vertically disposed safety blocks 150, there being one of the safety blocks 150 disposed adjacent each side wall 31, 32 of well 30.

The lower ends of safety blocks 150 are welded or otherwise suitably secured to opposed ends of a rocker shaft 151 (FIGURES 1 and 3). Rocker shaft 151 is journaled in a pair of bearing blocks 152 suitably secured to or formed integral with the front bottom angle bar 100. It should be noted that angle bar 100 is substantially longer than the rear bottom angle bar 101 and has a plate 153 secured thereto and extending rearwardly therefrom which is also suitably secured to floor 34 of well 30 and has the lower edges of bearing plates 90, 91 welded or otherwise suitably secured thereto. The inner end of bottom rear angle bar 101 may be secured to bearing plate 91.

Rocker shaft 151 is disposed immediately rearwardly of the vertical or front flange of bottom front angle bar 100 so the safety blocks 150 may bear against the rear surface of the latter flange when they occupy operative or upright position. The distal surfaces of safety blocks 150 each have an angle clip 157 pivotally mounted thereon which is loosely penetrated by an actuating rod 158 surrounded by a compression spring 159. The rear threaded end of rod 158 has a nut 160 mounted thereon which bears normally against the rear surface of the corresponding angle clip 157.

Each actuating rod 158 extends forwardly from the corresponding safety block 150 and is fixed to a tab portion 161 adjacent the lower portion of a substantially rectangular plate 162 which is a part of an impact-receiving block or a combination carrier-actuated safety release and cushion block assembly. The two cushion block assemblies are broadly designated at 163, 164. The block assemblies 163, 164 are pivotally suspended from the front portions of the forwardly and rearwardly extending side curb frame members 35, 36.

In addition to plate 162, each safety releasing block assembly 163, 164 includes an outer or front plate 165 which is suitably secured to the corresponding back plate 162 with a suitable yieldable material 166, such as hard rubber or the like, being sandwiched between plates 162, 165. Suitable vertically extending guard bars 167 are welded or otherwise suitably secured to the front surface of each front plate 165. The upper ends of the rear plates 162 are hingedly or pivotally connected to the front ends of the side curb frame members 35, 36, as at 168.

As shown in the lower left-hand portion of FIGURE 1, the front wall 21 of loading dock platform 22 is suitably recessed beneath the front portion of each angle bar or curb frame member 35, 36 to accommodate suitable yieldable means for normally urging outwardly the lower portions of the corresponding cushion block assemblies 163, 164. In this instance, the latter yieldable means is shown in the form of a leaf spring 170 suitably secured to the front portion of the corresponding forwardly and rearwardly extending curb frame member or angle bar 35 in the lower left-hand portion of FIGURE 1. The spring member 170 extends downwardly and is inherently biased forwardly against the rear surface of the plate 162 of the corresponding cushion block assembly 163.

It is apparent that a spring similar to spring 170 is provided for urging outwardly the lower portion of cushion block assembly 164 shown in the central right-hand portion of FIGURE 1 so that, in the absence of a truck or other object exerting sufficient pressure against the outer faces of cushion block assemblies 163, 164, they will occupy the inactive or extended position as shown in FIGURE 5.

When both cushion block assemblies 163, 164 occupy the inactive position shown in FIGURE 5 springs 170 apply sufficient outward pressure to cushion block assemblies 163, 164 to maintain safety blocks 150 in operative or substantially upright position. While safety blocks 150 occupy operative or substantially upright position, they are so positioned as to be engaged by the lower ends of corresponding legs or abutments $s$ suitably secured to and depending from ramp body 44. In this instance, the upper ends of legs $s$ are welded or otherwise suitably secured to the lower surface of main ramp plate 45. The lower end of each leg $s$ has a retaining lip $t$ on the rear portion thereof which may be formed by welding or otherwise securing an angle clip to the lower end of the corresponding leg $s$.

The length of each leg $s$ with respect to the height of the corresponding safety block 150 is such that the upper surface of main ramp plate 45 of ramp body 44 is substantially flush with the floor 20 of loading dock platform 22 when each leg $s$ is resting upon the corresponding safety block 150 and with the corresponding retaining lip $t$ projecting downwardly in back of the upper portion of the corresponding safety block 150. It is thus seen that the safety blocks 150 and legs $s$ will normally maintain ramp body 44 in substantially level or inoperative position at all times (unless braking device 140 is released), regardless of the amount of weight or downward pressure which may normally be applied to ramp body 44.

Now, assuming that ramp body 44 and ramp extension plate 60 are occupying the inoperative positions shown in FIGURES 3 and 5, when a truck or other carrier subsequently moves against the cushion block assemblies 163, 164 and causes the same to move rearwardly to the active position shown in FIGURES 6 and 7, for example, ramp body 44 will still remain in substantially level or inoperative position. Therefore, the rearward movement of the lower portions of the block assemblies 163 will simply compress the springs 159 as the rods 158 move rearwardly relative to the corresponding angle clip 157 and safety blocks 150.

However, upon the braking device 140 subsequently being released by an operative in the manner heretofore described, ramp body 44 will move upwardly, thus moving the retaining lip portions $t$ out of engagement with the corresponding safety blocks 150. The springs 159 will then cause the safety blocks 150 to move rearwardly to the inoperative position shown in FIGURES 6 and 7. It is thus seen that when safety blocks 150 occupy the tilted or inoperative position shown in FIGURES 1, 6 and 7, and when the ramp body 44 occupies a raised position, an operative may apply his weight or other weight to ramp body 44 to cause ramp body 44 to move downwardly. It it then happens that the floor of a truck or carrier bed, such as carrier bed B' in FIGURE 6, is positioned on a lower level than that of the floor 20 of dock platform 22, the front portion of ramp body 44 may move downwardly a substantial distance below the level of floor 20 and the front ends of frame members 35, 36 until the ramp extension plate 60 engages the floor of the corresponding truck or carrier bed B' or until the links 116, 117 move into engagement with the torque transmitting sleeve 87, whichever occurs first.

It should be noted that, although the upper ends of levers 120, 121 are gradually applying additional tension to tension springs 130 and thereby tending to gradually swing ramp extension plate 60 downwardly relative to ramp body 44 during downward movement of ramp body 44, if the rear edge of the floor of a truck bed or carrier bed is then positioned against either or both of the block assemblies 163, 164 and is substantially alined with ramp body 44 and ramp extension plate 60, ramp extension plate 60 will still engage the upper surface of the floor of the carrier bed and will swing upwardly relative to ramp body 44 in opposition to springs 130 while ramp body 44 is moving downwardly and until the plate 60 is in substantial alinement with main ramp plate 45. Of course, in the absence of a truck bed or carrier bed against the block assemblies 163, it is apparent that the springs 130 and levers 120, 121 will cause ramp extension plate 60 to become fully retracted by the time ramp body 44 reaches substantially level or normal, inoperative, position in the course of downward movement thereof.

There are instances in which the rear edge of the floor of a truck or carrier bed may not extend parallel with the vertical wall 21 of the loading dock platform 22 when it is being alined with the ramp assembly. This may cause one of the block assemblies 163, 164 to be moved to fully operative position while the other block assembly may remain in fully inoperative or at least partially inoperative position. However, this will not adversely affect the operation of the safety blocks 150 owing to the fact that, upon either of the springs 159 being compressed to the extent effected by movement of only one of the cushion block assemblies to fully operative position or substantially operative position, the strength of the spring 159 so compressed will be sufficient to overcome the strength of the spring 170 associated with that cushion block assembly which still remains in inoperative position. Thus, upon subsequent upward movement of ramp body 44 (effected by releasing braking device 140) that spring 159 which has been compressed by movement of only one of the cushion block assemblies to the operative position of FIGURE 7, will cause both of the safety blocks 150 to move to angular or inoperative position. Both blocks 150 move in unison because they are fixed to the common shaft 151 and the force transmitted from one of the blocks 150 to the other will be sufficient to cause the previously inactive cushion block assembly 163 or 164 to move to operative position although it is not then being engaged by a truck or carrier bed.

It should be noted that, in all instances following the use of the present ramp assembly in loading or unloading a carrier bed, the operative simply releases braking device 140 and permits ramp body 44 and ramp extension plate 60 to move upwardly relative to the corresponding carrier bed. After the carrier bed has subsequently moved away from the loading dock platform 22, the operative may apply his weight to the ramp body 44 and the legs s will then move downwardly with body 44 and into engagement with the corresponding safety blocks 150 which will have returned to operative position upon the carrier bed having moved away from the corresponding block assembly or assemblies 163, 164.

It is important that, although brake band m and its friction liner o normally apply sufficient pressure to brake shaft 125 to prevent the turning of motivating torsion bar 85 and torque transmitting sleeve 87, the spring q associated with braking device 140 should be so adjusted that the application of a relatively small amount of additional weight to ramp body 44, such as by an operator stepping on the free end portion thereof, is always sufficient to overcome the resisting torque in motivating torque bar 85, as well as the braking action applied to brake drum k by brake band m and friction liner o.

The present apparatus may be readily manufactured in mass production to fit in dock wells of different sizes, since the body 44 and, in some instances, the ramp extension plate 60 and lip torsion bar 72, are the only elements which would have to be made in various sizes to accommodate dock wells of different sizes, assuming that most dock wells are of substantially the same depth. The remaining parts of the apparatus may be of the same size to accommodate ramp bodies of all sizes generally in use, it only being necessary to make minor adjustments in the braking device 140, the angular position of torque applying sleeve 86 and in other adjustable parts to accommodate ramp bodies of different sizes and weights.

It is thus seen that I have provided an improved ramp assembly having novel operating mechanism in association therewith in which the raising of the ramp body 44 is effected solely through the force of torque or twist applied to the motivating torque bar 85 with manually operable brake means 140 for controlling the transmission of energy from the motivating torque bar to the ramp body. It is seen further that, among the other novel features, I have also provided a novel apparatus for imparting outward and inward movements to the ramp extension plate 60 for automatically moving the same between retracted and extended positions during the course of respective downward and upward movements of the ramp body.

In the drawings and specification there has been set forth a preferred embodiment of the invention and, although specific terms are employed they are used in a generic and descriptive, and not for purposes of limitation, the scope of the invention being defined in the claims.

I claim:

1. In a ramp assembly including a substantially rectangular ramp body having a front end and also having a rear end adapted to be pivotally mounted on a horizontal axis at its rear portion in an open-fronted well formed in a loading dock platform; operating mechanism for said ramp body comprising
    (a) a motivating torsion bar beneath said ramp body,
    (b) means restraining one end portion of said torsion bar against angular movement about its longitudinal axis,
    (c) means operatively connecting the other end portion of said torsion bar to said ramp body and responsive to untwisting angular movement of said other end portion of said torsion bar about its longitudinal axis to tilt said ramp body upwardly, said connecting means being responsive to downward movement of said ramp body, by addition of a sufficient weight thereto, to overbalance the torque in said torsion bar and to twist said other end portion of said torsion bar whereby said torsion bar continuously exerts an upward yielding force against said ramp body,
    (d) means operatively connected to said torsion bar for positively angularly adjusting said restraining means relative to said connecting means to vary the amount of twist in said torsion bar to vary the amount of upward yielding force applied thereby against said ramp body,
    (e) a slip braking device connected to said torsion bar and normally restraining untwisting angular movement of said other end portion of the torsion bar to normally maintain said ramp body in a depressed position, and
    (f) means operatively connected to said slip braking device for releasing the same and permitting said torsion bar to tilt said ramp body upwardly.

2. In a ramp assembly including a substantially rectangular ramp body having a front end and also having a rear end adapted to be pivotally mounted on a horizontal axis at its rear portion in an open-fronted well formed in a loading dock platform; operating mechanism for said ramp body comprising
    (a) a motivating torsion bar beneath said ramp body,
    (b) means restraining one end portion of said torsion bar against angular movement about its longitudinal axis,
    (c) means operatively connecting the other end portion of said torsion bar to said ramp body and responsive to untwisting angular movement of said other end portion of said torsion bar about its longitudinal axis to tilt said ramp body upwardly, said connecting means being responsive to downward movement of said ramp body, by addition of a sufficient weight thereto, to overbalance the torque in said torsion bar and to twist said other end portion of said torsion bar whereby said torsion bar continuously exerts an upward yielding force against said ramp body, (d) a brake shaft operatively connected to and rotatable in fixed proportional relation to said other end portion of said torsion bar, (e) a brake drum fixed on said brake shaft for rotation therewith, (f) a friction brake member fixed against rotation and engageable with said brake drum, (g) means yieldably biasing said brake member against said drum under sufficient pressure to secure said other end portion of said torsion bar against rotation, and (h) means for moving said brake member in opposition to said biasing means to release the restraint upon said torsion bar to permit the other end portion thereof to untwist and to tilt said ramp body upwardly.

3. In a ramp assembly including a substantially rectangular ramp body having a front end and also having a rear end adapted to be pivotally mounted on a horizontal axis at its rear portion in an open-fronted well formed in a loading dock platform; operating mechanism for said ramp body comprising (a) a motivating torsion bar beneath said ramp body, (b) means restraining one end portion of said torsion bar against angular movement about its longitudinal axis, (c) first connecting means operatively connecting the other end portion of said torsion bar to said ramp body and responsive to untwisting angular movement of said other end portion of said torsion bar about its longitudinal axis to tilt said ramp body upwardly, said connecting means being responsive to downward movement of said ramp body, by addition of a sufficient weight thereto, to overbalance the torque in said torsion bar and to twist said other end portion of said torsion bar whereby said torsion bar continuously exerts an upward yielding force against said ramp body, (d) an extension plate hingedly connected to the front end of said ramp body, (e) means biasing upwardly said extension plate toward an extended position substantially aligned with said ramp body, and (f) second connecting means operatively and yieldably connecting said first connecting means to a lower portion of said extension plate, said second connecting means being operable in response to said first connecting means for imparting downward movement to said extension plate during downward movement of said ramp body to position said extension plate in substantially right angular relation to said ramp body by the time said ramp body reaches substantially level position in the course of downward movement thereof.

4. In a ramp asesmbly including a substantially rectangular ramp body having a front end and also having a rear end adapted to be pivotally mounted on a horizontal axis at its rear portion in an open-fronted well formed in a loading dock platform; operating mechanism for said ramp body comprising (a) a motivating torsion bar beneath said ramp body, (b) means restraining one end portion of said torsion bar against angular movement about its longitudinal axis, (c) first connecting means operatively connecting the other end portion of said torsion bar to said ramp body and responsive to untwisting angular movement of said other end portion of said torsion bar about its longitudinal axis to tilt said ramp body upwardly, said connecting means being responsive to downward movement of said ramp body, by addition of a sufficient weight thereto, to overbalance the torque in said torsion bar and to twist said other end portion of said torsion bar whereby said torsion bar continuously exerts an upward yielding force against said ramp body, (d) an extension plate, (e) means hingedly connecting said extension plate to the front end of said ramp body and including a lip torsion bar, (f) means securing one end portion of said lip torsion bar to said extension plate, (g) means securing the other end portion of said lip torsion bar to said ramp body with the extension plate extending in substantial alignment with the upper surface of said ramp body whereby, upon said extension plate being swung downwardly with respect to said ramp body, said lip torsion bar is twisted along its length and yieldably opposes downward movement of said plate, and (h) second connecting means operatively connecting said first connecting means to a lower portion of said extension plate forwardly of said lip torsion bar and being operable in response to said first connecting means for imparting downward movement to said extension plate about the axis of said lip torsion bar during downward movement of said ramp body to position said extension plate in substantially right angular relation to said ramp body by the time said ramp body reaches a substantially level position in the course of downward movement thereof.

5. A ramp assembly according to claim 4 wherein said extension plate extends upwardly from said ramp body when said extension plate is in said substantially right angular relation to said ramp body to define a safety curb at the front end of said ramp body.

6. A structure according to claim 2, including means for adjustably varying the effectiveness of said biasing means in applying pressure to said brake member.

7. A structure according to claim 2, in which said brake shaft is journaled on and disposed beneath said ramp body, said connecting means (c) including at least one lever fixed on said brake shaft, and said means for moving said brake member comprising a pliable cable connected to said brake member and loosely penetrating said ramp body so it may be grasped and pulled by an operative to pull said brake member away from said drum.

8. In a ramp assembly having a tiltable ramp body adapted to fit in an open-fronted well formed in a dock platform, and said ramp body having its rear portion pivotally connected to an upper portion of a rear wall of said well and being angularly movable at least between a predetermined, substantially horizontal, normally inactive position and a predetermined more steeply inclined maximum-height position; the combination therewith of mechanism for tilting upwardly said ramp body about its pivotal connection comprising, (a) a motivating torsion bar mounted in said well, (b) torque applying means including means restraining one end of said torsion bar from rotation about its longitudinal axis, (c) means operatively connecting the other end of said torsion bar to said ramp body and being operable to transmit angular movement between said ramp body and said torsion bar, (d) said connecting means (c) applying a predetermined amount of torsional twist to said torsion bar when said ramp body occupies said inactive position, (e) a restraining device operatively connected to said torsion bar and normally restraining said other end of said torsion bar against angular movement about its longitudinal axis whereby said ramp body may be retained in any angular position within the limits of its lowermost and maximum-height positions, and (f) means for releasing said restraining device with respect to said torsion bar so the torsion bar may urge said ramp body toward said maximum-height position.

9. In a structure according to claim 8, in which said ramp body may be lowered by applying downward force thereto exceeding the resisting force of said torsion bar and said restraining device,
 (g) at least one normally substantially upright safety support block movably mounted in a lower portion of said well,
 (h) leg means carried by said ramp body and being engageable with the upper surface of said support block when the ramp body occupies said inactive position for preventing further downward movement thereof,
 (i) at least one normally forwardly biased impact block movably supported on said platform and adapted to be engaged and depressed by a carrier bed moving toward the front of the well,
 (j) resilient means connecting said support block to said impact block and being of such length that said impact block normally holds said safety block in alinement with said leg means, and
 (k) a lip on said leg means for engaging a rear portion of and thereby limiting rearward movement of said support block upon rearward depressing movement of said impact block whereby, upon subsequent upward movement of said ramp body and said leg means, said support block is released and said resilient means moves said support block rearwardly of said leg means so said ramp body may then be lowered below said normally inactive position.

10. In a ramp assembly including a substantially rectangular ramp body having a front end and also having a rear end adapted to be pivotally mounted on a horizontal axis at its rear portion in an open-fronted well formed in a loading dock platform; operating mechanism for said ramp body comprising
 (a) a motivating torsion bar beneath said ramp body,
 (b) means restraining one end portion of said torsion bar against angular movement about its longitudinal axis,
 (c) means responsive to untwisting angular movement of the other end portion of said torsion bar about its longitudinal axis to tilt said ramp body upwardly,
 (d) said last-named means (c) also being responsive to downward movement of said ramp body, by addition of a sufficient weight thereto to overbalance the torque in said torsion bar, to twist said other end portion of said torsion bar whereby said torsion bar continuously applies an upward yielding force to said ramp body,
 (e) a pair of laterally spaced impact blocks pivotally connected to and depending from the platform adjacent opposite sides of the front of said well and adapted to be engaged, depressed and thereby swung rearwardly to an operative position by a carrier bed moving into a loading position,
 (f) a pair of laterally spaced normally upright safety blocks having their lower portions pivotally supported and interconnected adjacent the bottom of said well and being disposed rearwardly of said impact blocks,
 (g) means yieldably urging outwardly the lower ends of said impact blocks to inoperative positions spaced from said platform,
 (h) resilient means connecting each safety block to the adjacent impact block and being of a length such that said safety blocks are normally held in predetermined upright positions by said impact blocks,
 (i) legs depending from said ramp body and engageable with said safety blocks when said body occupies a substantially horizontal position,
 (j) limiting means on said legs preventing rearward movement of said safety blocks when in engagement therewith and when either of said impact blocks is swung rearwardly in opposition to said urging means (g), and
 (k) each resilient means being formed so as to exert sufficient rearward force against the corresponding safety block to pivot both safety blocks rearwardly upon said legs being raised out of engagement with said safety blocks and while either impact block occupies said operative position so said ramp body may then be lowered below the level of said horizontal position.

11. In a loading ramp assembly having a ramp body adapted to be pivotally mounted at its rear portion within and adjacent the rear vertical wall of an open-fronted well formed in a loading dock platform, and wherein said well includes a bottom wall spaced a substantial distance below the level of the upper edge of said rear wall; operating mechanism for said ramp body comprising
 (a) a frame spaced beneath said ramp body and adapted to be secured in fixed relation to the bottom wall of said well,
 (b) a torque transmitting member journaled in said frame and having a crank arm extending substantially radially therefrom,
 (c) a motivating torsion bar having one end fixedly connected to and extending in axial alinement with said torque transmitting member,
 (d) a torque applying member journaled in said frame and fixedly connected to the other end of said torsion bar remote from said transmitting member,
 (e) means adjustably securing said torque applying member in fixed angular relation to said frame to prevent angular movement of said other end of said torsion bar about its longitudinal axis, and
 (f) means operatively connecting said crank arm to said ramp body and being operable to impart angular twisting movement to said first-named end of said torsion bar when said ramp body is moved downwardly from a relatively high tilted position to a substantially horizontal position whereby said torsion bar, said torque transmitting member and said connecting means (f) apply a continuous upward yielding force to said ramp body.

References Cited by the Examiner
UNITED STATES PATENTS

| | | | |
|---|---|---|---|
| 2,871,505 | 2/1959 | Clark | 296—76 X |
| 2,974,336 | 3/1961 | Kelley | 14—71 |
| 3,117,332 | 1/1964 | Kelley | 14—71 |

CHARLES E. O'CONNELL, *Primary Examiner.*

JACOB L. NACKENOFF, *Examiner.*

N. C. BYERS, *Assistant Examiner.*